(No Model.)

H. W. CALDWELL.
ELEVATOR BUCKET ATTACHMENT.

No. 248,703. Patented Oct. 25, 1881.

Attest:
Charles Pickles
J. E. Knight

Inventor:
Henry W. Caldwell
By Knight Bros
Attys

UNITED STATES PATENT OFFICE.

HENRY W. CALDWELL, OF CHICAGO, ILLINOIS.

ELEVATOR-BUCKET ATTACHMENT.

SPECIFICATION forming part of Letters Patent No. 248,703, dated October 25, 1881.

Application filed September 27, 1881. (No model.)

*To all whom it may concern:*

Be it known that I, HENRY W. CALDWELL, of Chicago, in the county of Cook and State of Illinois, have invented a certain new and useful Improvement in Elevator-Bucket Attachments, of which the following is a full, clear, and exact description, reference being had to the accompanying drawings, forming part of this specification.

My invention relates to a useful device for attaching elevator-buckets to the belt; and my invention consists in the combination, with a bolt having a head of frusto-conical shape, of a countersunk washer in which the head of the bolt fits, as shown in the accompanying drawings, in which—

Figure 1:
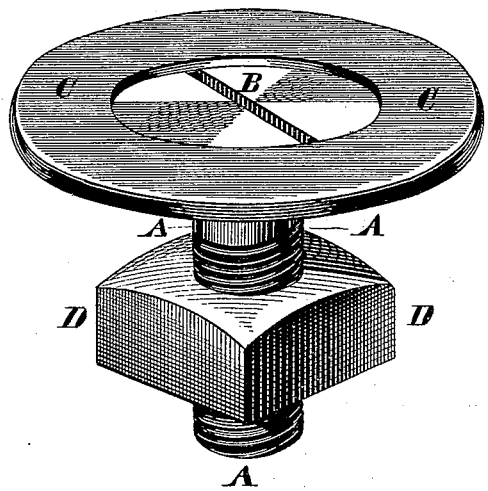
Figure 2:
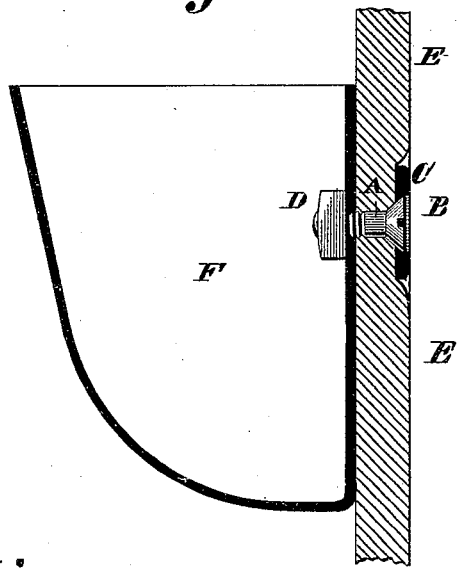

Figure 1 is an enlarged perspective view of the bolt and washer, and Fig. 2 is a detail vertical section of an elevator belt and bucket secured together by my improved attachment.

A is the bolt, and B its frusto-conical head. C is the countersunk washer, and D the nut or burr of the bolt. E is the elevator-belt, and F the bucket secured thereto.

The head of the bolt should so fit in the washer that its outer face would not be quite flush with the outer face of the washer, so that as the belt passes around a small pulley its bending will not bring one edge of the head of the bolt as it rocks in the washer in contact with the pulley. The washer acts as a cushion between the belt and the bolt-head, and the following are some of the advantages arising from its use:

First, as the belt passes around a small pulley the head of the bolt will rock in the washer, while the latter does not move on the belt, thus avoiding great injury to the belt arising from its being cut by the head of the bolt at such points.

Secondly, when the buckets are loaded heavily with grain there is no danger of the bolt-head pulling through the belt, as is now often the case, yet at the same time, if a heavy strain should be brought upon one of the buckets from an improper cause, such as foreign substances getting into the elevator-boot, the head of the bolt will draw through the washer and not tear the belt or destroy the bucket.

Thirdly, by the use of my attachment much heavier loads may be passed over much smaller pulleys than by the use of the old attachment.

Instead of the nut or burr D, the inner end of the bolt may be riveted upon the bucket; but as a fastening the nut would be the more preferable of the two.

The head of the bolt is preferably grooved, as shown, so that it may be held by a screwdriver or other instrument from turning while the burr D is being put on.

Having thus described my invention, the following is what I claim as new and useful therein and desire to secure by Letters Patent:

The herein-described elevator-bucket attachment, consisting of a bolt, A, having a frusto-conical head, B, and countersunk washer C, substantially as described.

HENRY W. CALDWELL.

Witnesses:
 MYRON NORTH,
 DWIGHT COOKE,
 FRANK C. CALDWELL.